US008150720B2

(12) United States Patent
Singh et al.

(10) Patent No.: US 8,150,720 B2
(45) Date of Patent: Apr. 3, 2012

(54) DISPATCH MANAGEMENT MODEL

(75) Inventors: Abtar Singh, Kennesaw, GA (US);
Sushil K Bansal, Kennesaw, GA (US);
Pawan K Churiwal, Atlanta, GA (US);
Patrick P Milliken, Wilmington, NC (US)

(73) Assignee: Emerson Retail Services, Inc., Kennesaw, GA (US)

( * ) Notice: Subject to any disclaimer, the term of this patent is extended or adjusted under 35 U.S.C. 154(b) by 946 days.

(21) Appl. No.: 11/214,179

(22) Filed: Aug. 29, 2005

(65) Prior Publication Data

US 2007/0050221 A1   Mar. 1, 2007

(51) Int. Cl.
*G06Q 10/00* (2012.01)
(52) U.S. Cl. ............... 705/7.25; 705/7.13; 705/7.22; 700/11; 700/28; 700/99; 700/103
(58) Field of Classification Search ............... 705/7–10
See application file for complete search history.

(56) References Cited

U.S. PATENT DOCUMENTS

| | | | | |
|---|---|---|---|---|
| 4,387,578 A * | 6/1983 | Paddock | ......................... | 62/127 |
| 4,490,986 A * | 1/1985 | Paddock | ......................... | 62/127 |
| 4,553,400 A * | 11/1985 | Branz | ......................... | 62/127 |
| 4,612,775 A * | 9/1986 | Branz et al. | ......................... | 62/126 |
| 4,843,575 A * | 6/1989 | Crane | ......................... | 701/99 |
| RE33,620 E * | 6/1991 | Persem | ......................... | 62/215 |
| 5,303,112 A * | 4/1994 | Zulaski et al. | ......................... | 361/67 |
| 5,381,669 A * | 1/1995 | Bahel et al. | ......................... | 62/129 |
| 5,602,761 A * | 2/1997 | Spoerre et al. | ......................... | 702/179 |
| 5,839,291 A * | 11/1998 | Chang | ......................... | 62/126 |
| 5,861,807 A * | 1/1999 | Leyden et al. | ......................... | 340/568.2 |
| 6,490,506 B1 * | 12/2002 | March | ......................... | 700/286 |
| 6,523,130 B1 * | 2/2003 | Hickman et al. | ......................... | 714/4 |
| 6,644,848 B1 * | 11/2003 | Clayton et al. | ......................... | 374/7 |
| 6,983,321 B2 * | 1/2006 | Trinon et al. | ......................... | 709/224 |
| 7,171,372 B2 * | 1/2007 | Daniel et al. | ......................... | 705/7 |
| 2002/0035495 A1 * | 3/2002 | Spira et al. | ......................... | 705/7 |
| 2002/0095269 A1 | 7/2002 | Natalini et al. | | |
| 2002/0113877 A1 * | 8/2002 | Welch | ......................... | 348/148 |
| 2002/0189267 A1 * | 12/2002 | Singh et al. | ......................... | 62/126 |
| 2003/0004765 A1 * | 1/2003 | Wiegand | ......................... | 705/7 |
| 2003/0050824 A1 * | 3/2003 | Suermondt et al. | ......................... | 705/10 |
| 2003/0074285 A1 * | 4/2003 | Hoffman et al. | ......................... | 705/30 |
| 2003/0191606 A1 * | 10/2003 | Fujiyama et al. | ......................... | 702/185 |
| 2004/0049715 A1 * | 3/2004 | Jaw | ......................... | 714/43 |
| 2004/0111186 A1 * | 6/2004 | Rossi et al. | ......................... | 700/276 |
| 2004/0153437 A1 * | 8/2004 | Buchan | ......................... | 707/1 |
| 2004/0210419 A1 | 10/2004 | Wiebe et al. | | |
| 2004/0261431 A1 * | 12/2004 | Singh et al. | ......................... | 62/125 |
| 2005/0125439 A1 * | 6/2005 | Nourbakhsh et al. | ......................... | 707/102 |

(Continued)

OTHER PUBLICATIONS (REH, F. John) "Cost Benefit Analysis" http://management.about.com/cs/money/a/CostBenefit.htm Dec. 8, 2003.

(Continued)

*Primary Examiner* — R. David Rines
(74) *Attorney, Agent, or Firm* — Harness, Dickey & Pierce, P.L.C.

(57) ABSTRACT

A method includes monitoring a system for fault conditions, determining an estimated energy loss based on the fault condition, determining an estimated product loss and/or sales loss based on the fault condition, and scheduling maintenance to correct the fault condition. Maintenance is schedule to correct the fault condition prior to the energy loss and the product loss exceeding maintenance costs.

11 Claims, 2 Drawing Sheets

U.S. PATENT DOCUMENTS

| | | | |
|---|---|---|---|
| 2005/0149570 A1* | 7/2005 | Sasaki et al. | 707/104.1 |
| 2006/0015777 A1* | 1/2006 | Loda | 714/38 |
| 2007/0027735 A1* | 2/2007 | Rokos | 705/7 |
| 2007/0186569 A1* | 8/2007 | Street et al. | 62/132 |
| 2008/0109185 A1* | 5/2008 | Cheung et al. | 702/184 |
| 2009/0112672 A1* | 4/2009 | Flamig et al. | 705/8 |

OTHER PUBLICATIONS

International Search Report and the Written Opinion of the International Searching Authority, or the Declaration for PCT/US/06/33702.

Supplementary European Search Report regarding European Application No. EP06790063, dated Jun. 15, 2010.

* cited by examiner

DISPATCH MANAGEMENT MODEL

FIELD

The present teachings relate to refrigeration systems and more particularly to a cost/benefit module and a maintenance scheduling module of a refrigeration system.

BACKGROUND

Refrigerated and frozen food product travels from processing plants to retailers, where the food product remains on display case shelves for extended periods of time. The display case shelves are typically part of a refrigeration system for storing and displaying the refrigerated and frozen food product and must be constantly cooled to ensure maximum product life. Retailers attempt to maximize the shelf-life and quality of the stored food product while concurrently maximizing the efficiency of the refrigeration system. In so doing, retailers receive a profit through sales of quality products while spending a minimum on energy costs associated with product display (i.e., refrigeration, etc.).

Any breakdown in the refrigeration system or variation in performance can cause food quality issues and negatively impact the profit of the retailer. Therefore, retailers typically monitor refrigeration system equipment to ensure that the equipment operates at expected levels. When the refrigeration equipment is operating at a reduced capacity, or is not operating at all, retailers are accustom to immediately calling a repair technician to promptly restore the refrigeration system to normal operation.

For example, when a retailer notices a refrigeration system fault such as a condenser fan failure, the retailer typically contacts a repair person as soon as possible to repair the fan and restore the refrigeration system to normal operation. The retailer usually pays a higher maintenance premium for an emergency service call due to the required response time and urgency of the situation (i.e., overtime pay, weekend maintenance, etc.). The added expense associated with emergency service is typically justified as emergency maintenance costs do not typically outweigh the expense associated with loss of the refrigerated and/or frozen food product, loss of product sales, and/or consumption of excess energy.

In addition to the premium associated with emergency service, retailers often incur higher repair bills due to the frequency in which service is performed. The fear of spoilage prompts retailers to schedule maintenance at the first inclining of a fault condition. The reactive nature of such a system results in frequent service calls and, thus, higher overall maintenance costs as repair technicians typically require a flat fee for simply responding to the call (i.e., driving to the particular location). Therefore, because retailers are reactive to refrigeration system faults and do not typically have a predictive or condition-based maintenance schedule in place, most retailers incur higher-than-necessary maintenance costs.

SUMMARY

A method includes monitoring a system for fault conditions, determining an estimated energy loss based on the fault condition, determining an estimated product loss and/or sales loss based on the fault condition, and scheduling maintenance to correct the fault condition. Maintenance is schedule to correct the fault condition prior to the energy loss and the product loss exceeding maintenance costs.

Further areas of applicability of the present teachings will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

Figure 1:
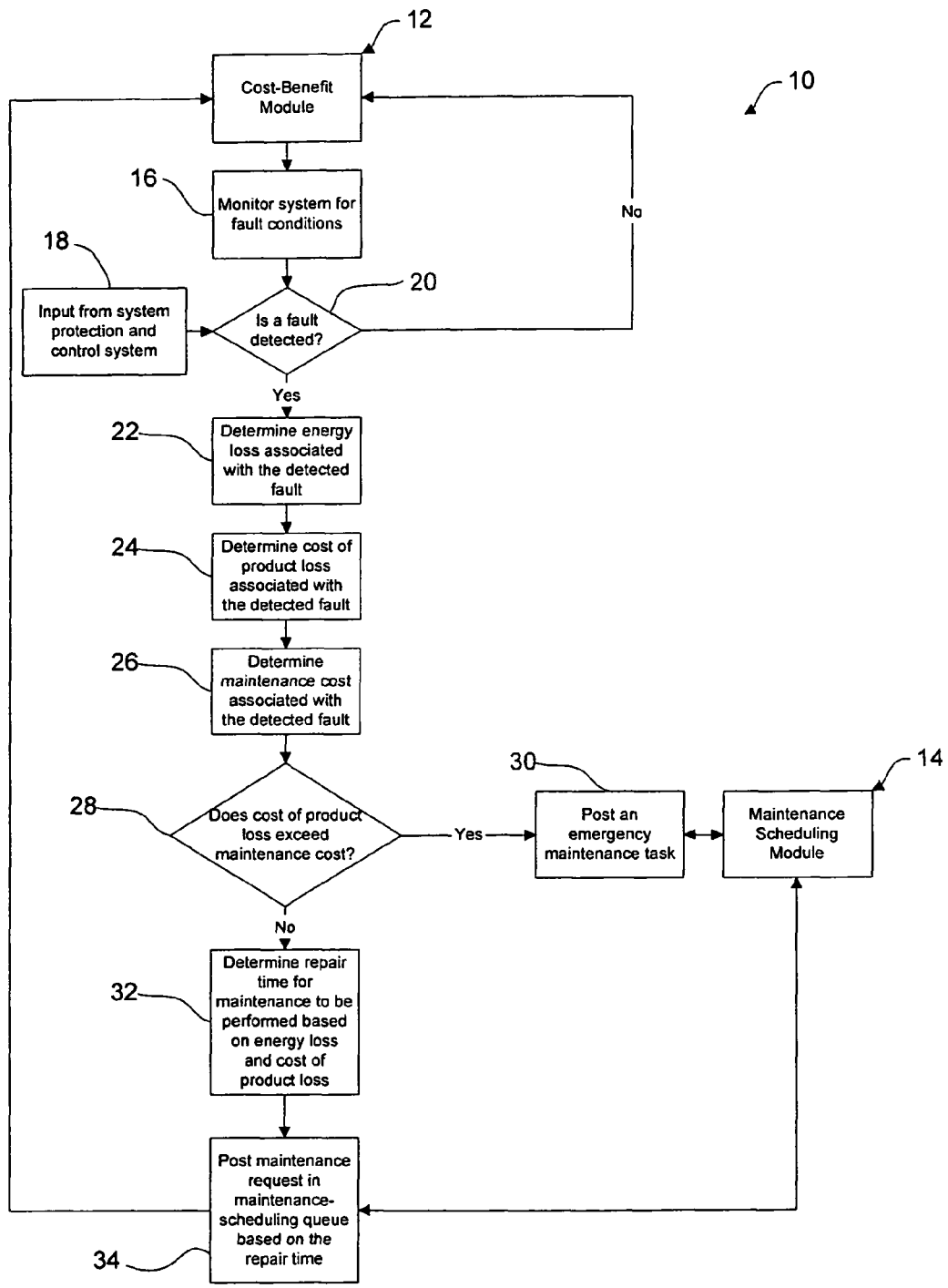
FIG. 1 is a flowchart of a cost-benefit maintenance module for a system in accordance with the present teachings.

The following description is merely exemplary in nature and is in no way intended to limit the teachings, application, or uses.

As used herein, the term module refers to an application specific integrated circuit (ASIC), an electronic circuit, a processor (shared, dedicated, or group), and memory that execute one or more software or firmware programs, a combinational logic circuit, and/or other suitable components that provide the described functionality.

With reference to the figures, a maintenance management module 10 is provided and includes a cost-benefit module 12 and a maintenance-scheduling module 14. The cost-benefit module 12 may be used to determine an optimum time to service equipment (not shown) based on a particular fault detected. The cost-benefit module 12 may receive information regarding the particular fault, calculate a time in which the fault should be corrected based on an estimated loss, and output a maintenance task to repair the fault within the calculated time. The maintenance-scheduling module 14 may work in conjunction with the cost-benefit module 12 to bundle maintenance tasks and allow a repair technician to correct multiple system faults on a single service call and within regular working hours.

The cost-benefit module 12 may directly monitor a system for system faults 16 or may receive an input from a protection and control system regarding system operating conditions 18. In either of the foregoing situations 16, 18, the cost-benefit module 12 first determines if a system fault is detected 20. If a fault is not detected, the cost-benefit module 12 is started anew and is continually looped during operation of the system until a fault is detected. If a fault is detected, the cost-benefit module 12 first determines an energy cost associated with the particular fault 22. It should be understood that while the cost-benefit module 12 will be described as electronically monitoring and reporting faults that manual monitoring and reporting of faults (i.e., by way of human interaction) may be used in conjunction with, or in place of, such electronic monitoring and reporting.

Energy cost is generally defined as an increase in energy consumption due to continued operation of the system under the fault condition. For example, in a refrigeration system, if a condenser coil is partially blocked, continued operation of the refrigeration system will consume additional energy when compared to the same system having a clean condenser coil. Therefore, the energy cost is generally defined as the additional cost associated with operating the refrigeration system with a dirty condenser coil when compared operation of the same refrigeration system with a clean condenser coil. Energy cost is generally given by:

$$\text{Energy Cost} = \text{Power} * \text{Price Per Unit} * \text{Time} \qquad \text{(Equation 1)}$$

In Equation 1, "Energy Cost" may include units of dollars ($) or any other currency unit, "Power" may include units of kilowatts (kW) or any other unit of power, and "Time" may include units of hours (h) or other unit of time. "Price Per Unit" may be expressed in terms of currency per unit energy, such as dollars per kilowatt-hour (i.e., the unit of "Energy Cost" divided by the unit of "Power" times the unit of "Time"). Written in terms of exemplary units, Equation 1 may be expressed as:

$$\$ = kW * \$/kWh * h$$

In addition to energy cost, a product loss and/or sales loss due to the particular fault can be determined 24. Product loss is generally defined as any profit or product lost due to the system fault and can therefore be represented as a dollar amount. For example, in a refrigeration system application, product loss can be generally defined as spoiled or damaged food product caused by insufficient cooling. Sales loss is generally defined as any profit or product lost due to the system fault that causes a consumer to refrain from purchasing product. Sales loss may be caused by a product being in an apparent undesirable condition when in fact the product is within a prescribed temperature range. For example, a product may have condensation formed thereon caused by insufficient cooling, which may cause a consumer to refrain from purchasing the product. Once energy cost and product loss are determined, an estimated total loss can be approximated by summing energy cost and cost of product loss:

$$\text{Estimated Total Loss} = \text{Energy Cost} + \text{Cost of Product Loss and/or Sales Loss} \quad \text{(Equation 2)}$$

The estimated total loss is used by the cost-benefit module 12 in determining a maintenance cost associated with the particular fault detected 26. Maintenance cost is generally defined by the following equation where labor costs include a repair technician's hourly or daily service rate, travel charges include flat service fees (i.e., for responding to the maintenance request), mileage, and truck-related expenses, and parts cost include any cost associated with replacement parts used in performing the maintenance task:

$$\text{Maintenance Cost} = \text{Labor Cost} + \text{Travel Charges} + \text{Parts Cost} \quad \text{(Equation 3)}$$

In a balanced system with no profit or loss, equipment maintenance should be scheduled such that the estimated total loss generally equals maintenance cost:

$$\text{Estimated Total Loss} = \text{Maintenance Cost} \quad \text{(Equation 4)}$$

If the estimated total loss is generally equal to the maintenance cost, Equation 2 can be substituted into Equation 4 to yield the following relationship:

$$\text{Energy Cost} + \text{Cost of Product Loss and/or Sales Loss} = \text{Maintenance Cost} \quad \text{(Equation 5)}$$

Solving Equation 5 for Energy Cost and substituting Equation 1 into Equation 5 yields the following relationship:

$$\text{Power} * \text{Price Per Unit} * \text{Time} = \text{Maintenance Cost} - \text{Cost of Product Loss and/or Sales Loss} \quad \text{(Equation 6)}$$

Solving Equation 6 for the time element of Equation 1 yields the following relationship:

$$\text{Time} = (\text{Maintenance Cost} - \text{Cost of Product Loss and/or Sales Loss})/(\text{Power} * \text{Price Per Unit}) \quad \text{(Equation 7)}$$

In Equations 2-7, the terms "Estimated Total Loss," "Energy Cost," "Cost of Product Loss and/or Sales Loss," "Maintenance Cost," "Labor Cost," "Travel Charges," and "Parts Cost" may include units of dollars, or any other currency.

At this point, the cost-benefit module 12 may determine the energy cost as a function of the maintenance cost and product/sales loss using Equation 6 and can determine a time in which the system fault must be corrected using Equation 7. However, prior to doing so, the energy module 12 will first determine if the product/sales loss exceeds maintenance cost 28. If the product/sales loss exceeds maintenance cost, the cost-benefit module 12 declares an emergency maintenance task that is immediately scheduled by the scheduling module 14 to promptly correct the system fault and restore the system to normal operation 30. When product/sales loss exceeds maintenance cost, delaying maintenance is not economically sound as the costs associated with product/sales loss outweigh those associated with correcting the fault (i.e., maintenance cost). Therefore, when product/sales loss exceeds maintenance cost, the required maintenance should be performed as soon as possible.

Whenever the maintenance cost is lower than the cost of product/sales loss, Equation 7 may yield either a value of zero or a negative number, indicating that the fault should immediately be corrected. If the maintenance cost is greater than the cost of product/sales loss, Equation 7 may yield a positive number, indicating the time in which the fault should be corrected. It should be noted that Equation 7 may still yield a number that indicates that a fault should immediately be corrected even when the maintenance cost exceeds the cost of product/sales loss. For example, if maintenance cost exceeds the cost of product/sales loss, but the energy consumed per unit is relatively high, Equation 7 will yield a small number indicating that the fault should be immediately corrected.

For example, in a refrigeration system, if a compressor fault is detected such that the compressor is no longer able to circulate refrigerant through the system, the system is not able to provide any cooling effect. The total loss of cooling likely results in a total product loss (i.e., food spoilage). Therefore, the cost-benefit module 12 will declare an "emergency" fault and the maintenance-scheduling module 14 will promptly respond to the fault condition by immediately scheduling maintenance. For such emergency faults, maintenance is scheduled to correct the fault even if additional maintenance costs are incurred, such as overtime costs and weekend service charges to prevent product loss.

The cost-benefit module 12 delays maintenance for less-urgent or "non-emergency" faults by using equation 7 to determine a repair time in which the system fault must be corrected based on energy costs and cost of product loss 32. In so doing, the cost-benefit module 12 is able to balance additional energy costs and cost of product loss associated with the system fault against the cost of repair. The cost-benefit module 12 is able to put off repairing the "non-emergency" fault conditions until economically necessary (i.e., when product loss and/or energy costs exceed the maintenance cost). Once the repair time is determined, the cost-benefit module 12 may post a maintenance request in a maintenance-scheduling queue 34, listing the particular fault, the corrective action, and the time in which the fault must be corrected.

For example, if a refrigeration system experiences a non-emergency fault such as a dirty condenser coil during a winter season, it is unlikely that there is any cost associated with product loss (i.e., cost of product loss is essentially zero). The dirty condenser coil causes the refrigeration system to consume additional energy at a constant rate of 10 cents per kWh, assuming that the additional energy consumption remains constant (i.e., the condenser coil does not become more clogged over time). The additional 10 center per kWh translates into a cost per unit of $0.1. Therefore, assuming that the maintenance cost to repair the blocked condenser coil is onethousand dollars, the time in hours to repair the condenser coil (i.e., the repair time) can be determined by inserting the above variables into Equation 7:

$$\text{Time(hours)} = (\$1000-0)/(10*0.1)$$

The above relationship yields a repair time of 1000 hours or approximately 41 days. Therefore, the cost-benefit module 12 will post a repair task in the maintenance-scheduling queue to clean the condenser coil within 41 days.

Figure 2:
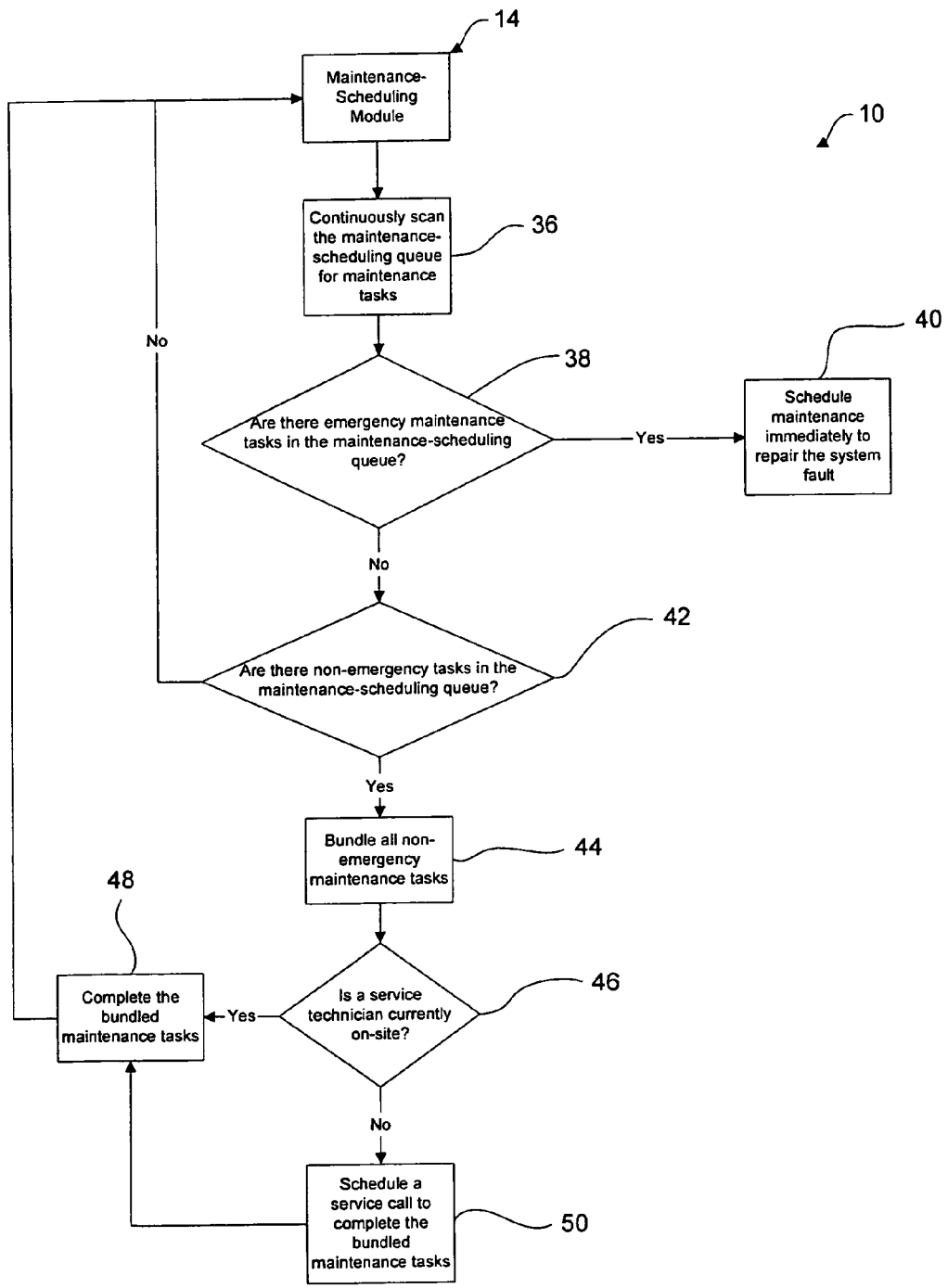
FIG. 2 is a flowchart of a maintenance-scheduling module for use with the cost-benefit module of FIG. 1.

With particular reference to FIG. 2, the maintenance-scheduling queue is continuously monitored by the maintenance-scheduling module 14 so that emergency tasks are completed immediately and non-emergency tasks are completed within the calculated repair time 36. The maintenance-scheduling module 14 first determines if there are any emergency repair tasks posted in the maintenance-scheduling queue 38. If there are emergency maintenance tasks in the scheduling queue, the maintenance-scheduling module 14 immediately schedules a repair technician to correct the fault 40.

If there are no emergency maintenance tasks posted in the maintenance-scheduling queue, the maintenance-scheduling module 14 determines if there are any non-emergency maintenance tasks posted 42. If the maintenance-scheduling queue is empty, the maintenance-scheduling module 14 continuously monitors the queue until a maintenance task is posted. However, if non-emergency maintenance tasks are posted in the queue, the maintenance-scheduling module 14 bundles the non-emergency maintenance tasks 44 such that like repairs can be completed by a repair technician on a single visit. In addition, the scheduling module 14 is also able to bundle maintenance tasks by an estimated time required to complete the task. In so doing, the maintenance-scheduling module 14 is able to bundle maintenance tasks into eight-hour blocks of time and can therefore minimize overtime and premium rates paid to repair technicians.

Bundling repair tasks allows the maintenance-scheduling module 14 to contact a repair technician to correct more than one fault condition, rather than call a repair technician each time a fault condition is detected. In so doing, the maintenance-scheduling module 14 is able to reduce maintenance costs by reducing the number of individual service calls.

Once the maintenance tasks are bundled, the maintenance-scheduling module 14 is able to schedule repair at an inexpensive and convenient time. Inexpensive repairs can be accomplished if all bundled repairs are accomplished during a single service call or if non-emergency repairs are completed while a repair technician is already on-site. Therefore, once the maintenance tasks are bundled, the maintenance-scheduling module 14 may determine if a repair technician is on-site and able to repair additional emergency or non-emergency maintenance tasks in the maintenance-scheduling queue 46.

If a repair technician is on-site to repair an emergency fault, the maintenance-scheduling module 14 is able to scan the maintenance-scheduling queue to determine if there are other emergency or non-emergency maintenance tasks that can be accomplished while the repair technician is on-site. For example, in a refrigeration system, if a repair technician is called to repair a failed compressor motor (i.e., an emergency fault) the maintenance-scheduling module 14 may scan the maintenance-scheduling queue to determine if there are other bundled repair tasks (i.e., emergency or non-emergency) that the technician can also repair while on-site 48. In so doing, the maintenance-scheduling module 14 is able to reduce maintenance costs by completing multiple tasks during one service call.

If a technician is not on-site, and there are maintenance tasks in the maintenance-scheduling queue, the maintenance-scheduling module 14 will schedule maintenance for those faults that are almost at the calculated repair date 50. In addition, the maintenance-scheduling module 14 will bundle those maintenance tasks that can be accomplished with those that are almost at the calculated repair date and complete these additional maintenance tasks during the same service call. In so doing, the maintenance-scheduling module 14 is able to reduce costs associated with multiple trips to the same location by repair technicians and is able to ensure that the repairs are completed before product loss.

The description of the teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A computer program product consisting of computer executable instructions stored on a computer readable medium which, when executed by a computer, cause the computer to execute a method comprising:
   receiving data associated with monitoring a system for a fault condition;
   determining a maintenance cost to correct said fault condition (Maintenance Cost);
   determining an amount of increased energy consumption due to continued operation of the system under the fault condition (Increased Energy Consumption), a product loss associated with said fault condition (Cost of Product Loss), and a sales loss associated with said fault condition (Sales Loss);
   scheduling maintenance to correct said fault condition by determining an amount of time within which said fault condition is to be corrected (Amount of Time), by using:

Amount of Time=(Maintenance Cost−Cost of Product Loss and/or Sales Loss)/(Increased Energy Consumption*Price Per Unit), wherein the Price Per Unit is a cost of energy.

2. The computer program product of claim 1 further comprising determining a level of urgency associated with performance of said maintenance to correct said fault condition based on comparing said Maintenance Cost with a monetary value including at least one of an additional energy cost resulting from said Increased Energy Consumption, said Cost of Product Loss, and said Sales Loss, wherein said scheduling said maintenance is based on said level of urgency.

3. The computer program product of claim 2, further comprising bundling said maintenance with at least one of a plurality of other maintenance requests based on said level of urgency.

4. The computer program product of claim 3, further comprising completing said bundled maintenance at one service call.

5. The computer program product of claim 1, wherein when the Amount of Time is less than or equal to zero, the scheduling of maintenance is such that the fault condition is corrected immediately.

6. The computer program product of claim 1, further comprising performing said maintenance when at least one of an additional energy cost resulting from said Increased Energy Consumption, said Cost of Product Loss, and said Sales Loss, exceeds said maintenance cost.

7. The computer program product of claim 1, wherein said scheduling includes listing said maintenance with a plurality of other maintenance requests.

8. The computer program product of claim 1, wherein said monitoring includes electronic monitoring.

9. The computer program product of claim 1, wherein said receiving data associated with monitoring said system includes the computer receiving operating conditions of said system from a control system associated with said system.

10. The computer program product of claim 1, wherein said monitoring includes manual monitoring.

11. The computer program product of claim 1, further comprising determining a second fault condition and a level of urgency of said second fault condition.

* * * * *

UNITED STATES PATENT AND TRADEMARK OFFICE
CERTIFICATE OF CORRECTION

PATENT NO. : 8,150,720 B2  
APPLICATION NO. : 11/214179  
DATED : April 3, 2012  
INVENTOR(S) : Abtar Singh et al.

Page 1 of 1

It is certified that error appears in the above-identified patent and that said Letters Patent is hereby corrected as shown below:

| | |
|---|---|
| Title Page, item (57), Abstract, Line 5 | "schedule" should be --scheduled--. |
| Column 1, Lines 47-48 | "inclining" should be --inclination--. |
| Column 1, Line 63 | "schedule" should be --scheduled--. |
| Column 4, Line 65 | "10 center" should be --10 cents--. |
| Column 6, Line 43 | After "cost of energy" insert --per unit of time--. |

Signed and Sealed this  
Third Day of July, 2012

David J. Kappos  
*Director of the United States Patent and Trademark Office*